US012771206B2

(12) United States Patent
Grelle et al.

(10) Patent No.: US 12,771,206 B2
(45) Date of Patent: Oct. 20, 2026

(54) ROTOR ASSEMBLY, AND SYNCHRONOUS MACHINE INCLUDING THE ROTOR ASSEMBLY

(71) Applicant: MAHLE International GmbH, Stuttgart (DE)

(72) Inventors: Thorsten Grelle, Stuttgart (DE); Florian Osdoba, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 232 days.

(21) Appl. No.: 18/704,453

(22) PCT Filed: Sep. 26, 2022

(86) PCT No.: PCT/EP2022/076640
§ 371 (c)(1),
(2) Date: Apr. 24, 2024

(87) PCT Pub. No.: WO2023/072503
PCT Pub. Date: May 4, 2023

(65) Prior Publication Data

US 2025/0239910 A1 Jul. 24, 2025

(30) Foreign Application Priority Data

Oct. 25, 2021 (DE) ......................... 102021212017.2

(51) Int. Cl.
*H02K 7/00* (2006.01)
*H02K 9/22* (2006.01)
(Continued)

(52) U.S. Cl.
CPC ............ *H02K 7/003* (2013.01); *H02K 9/227* (2021.01); *H02K 11/0094* (2013.01);
(Continued)

(58) Field of Classification Search
CPC .... H02K 7/003; H02K 9/227; H02K 11/0094; H02K 11/042; H02K 2209/00; H02K 2211/03
See application file for complete search history.

(56) References Cited

U.S. PATENT DOCUMENTS 2,897,383 A 7/1959 Barrows
4,570,094 A * 2/1986 Trommer ............ H02K 11/042
310/68 R
(Continued)

FOREIGN PATENT DOCUMENTS

AT 226802 B 4/1963
CN 111769673 * 10/2020 ............ H02K 9/197
(Continued)

OTHER PUBLICATIONS

Machoine translation of CN 111769673; Chen et al. (Year: 2020).*
English abstract for DE-2516505.
English abstract for DE-102013217821.

*Primary Examiner* — Terrance L Kenerly
(74) *Attorney, Agent, or Firm* — Fishman Stewart PLLC

(57) ABSTRACT

A rotor assembly for an inductively electrically excited synchronous machine may include a hollow shaft, a rotor connected to the hollow shaft, and a secondary-side circuit of an energy transmitter. The secondary-side circuit may be arranged in a rotationally fixed manner in the rotor assembly. The secondary-side circuit may include a rectifier. The rectifier may include a printed circuit board and at least one electrical component part fastened to the printed circuit board and a secondary coil. The rectifier may be aligned transversely to an axis of rotation of the hollow shaft and may be arranged in a rotationally fixed manner in a cavity of the hollow shaft. The rectifier may include a cooling body abutting against the printed circuit board such that the
(Continued)

cooling body faces away from the at least one electrical component part and transmits heat.

20 Claims, 3 Drawing Sheets

(51) Int. Cl.
*H02K 11/00* (2016.01)
*H02K 11/042* (2016.01)

(52) U.S. Cl.
CPC ....... *H02K 11/042* (2013.01); *H02K 2209/00* (2013.01); *H02K 2211/03* (2013.01)

(56) References Cited

U.S. PATENT DOCUMENTS

| | | | | |
|---|---|---|---|---|
| 5,001,376 | A | 3/1991 | Iseman | |
| 5,389,400 | A * | 2/1995 | Ting | C04B 41/009 427/249.7 |
| 2006/0208581 | A1 * | 9/2006 | Ikuta | H02K 11/05 310/58 |
| 2015/0051671 | A1 * | 2/2015 | Browne | A61N 5/0616 607/90 |

FOREIGN PATENT DOCUMENTS

| | | | | |
|---|---|---|---|---|
| DE | 2516505 | A1 | 10/1976 | |
| DE | 20204584 | U1 | 8/2003 | |
| DE | 102013217821 | A1 | 3/2015 | |
| EP | 2869316 | A1 | 5/2015 | |
| FR | 2963199 | A1 * | 1/2012 | F04D 29/5813 |

* cited by examiner

ROTOR ASSEMBLY, AND SYNCHRONOUS MACHINE INCLUDING THE ROTOR ASSEMBLY

CROSS-REFERENCE TO RELATED APPLICATIONS

This application claims priority to International Patent Application No. PCT/EP2022/076640, filed on Sep. 26, 2022, and German Patent Application No. DE 10 2021 212 017.2, filed on Oct. 25, 2021, the contents of both of which are hereby incorporated by reference in their entirety.

TECHNICAL FIELD

The invention relates to a rotor assembly for an inductively electrically excited synchronous machine and the inductively electrically excited synchronous machine comprising the rotor assembly.

BACKGROUND

An inductively electrically excited synchronous machine is known, for example, from EP 2 869 316 B1 and has a stator and a rotor, which is arranged in a rotationally fixed manner in the stator. The stator and the rotor are supplied with energy and can interact with one another electromagnetically. To transmit the energy into the rotating rotor, an inductive energy transmitter is provided thereby, which has a stator-side or stationary primary coil, respectively, and a rotor-side or rotating secondary coil, respectively. A rotor-side or rotating rectifier, respectively, is further provided. The rectifier is formed by means of a printed circuit board comprising several electrical component parts, which are connected to one another. The printed circuit board is usually fastened to the rotor or to a shaft of the synchronous machine and the electrical component parts are arranged in a diameter around the shaft.

During the operation of the synchronous machine, the rectifier is rotated together with the shaft and the electrical component parts experience large centrifugal forces and vibrations. This can lead to damage to the electrical component parts and/or the soldered joints thereof and thus to the failure of the synchronous machine. Disadvantageously, the smallest diameter of the printed circuit board is limited to the bottom and the electrical component parts as well as the connection thereof to the printed circuit board have to thus meet predetermined strength requirements. The selection of the electrical component parts for the rectifier of the synchronous machine is thus limited and the costs for the rectifier are correspondingly high.

The rotor and the shaft furthermore heat up significantly during the operation of the synchronous machine. Due to the fact that the rectifier is positioned close to the shaft and close to the rotor, the upper temperature limit of the shaft and of the rotor is limited by the upper temperature limit of the electrical component parts of the rectifier. The cooling of the shaft and of the rotor thus represents a further challenge.

SUMMARY

It is thus the object of the invention to specify an improved or at least alternative embodiment for a synchronous machine and a rotor assembly for the synchronous machine of the generic type, in the case of which the described disadvantages are overcome.

This object is solved according to the invention by the subject matter of the independent claim(s). Advantageous embodiments are subject matter of the dependent claim(s).

A rotor assembly is provided for an inductively electrically excited synchronous machine. The synchronous machine can be provided for a motor vehicle. The rotor assembly thereby has a hollow shaft, which can be rotated about an axis of rotation, and a rotor, which is connected in a rotationally fixed manner to the hollow shaft. The rotor assembly additionally has a secondary-side circuit of an energy transmitter, wherein the secondary-side circuit is arranged in a rotationally fixed manner in the rotor assembly. The secondary-side circuit thereby has a secondary coil and a rectifier comprising a printed circuit board and comprising at least one electrical component part fastened to the printed circuit board. According to the invention, the rectifier is aligned transversely to the axis of rotation and is arranged in a rotationally fixed manner in a cavity of the hollow shaft.

In the context of the present invention, the terms “radially” and “axially” are always based on the axis of rotation. The term “revolve” refers to the axis of rotation of the hollow shaft, unless defined otherwise.

The cavity is formed within the hollow shaft and the rectifier is arranged in the cavity of the hollow shaft or within the hollow shaft, respectively. The cavity can thereby be limited to the outside by means of a wall forming the hollow shaft and the rectifier can be firmly connected directly or indirectly to the hollow shaft or to the wall of the hollow shaft, respectively. The rectifier can be firmly connected in a non-positive and/or positive manner to the hollow shaft or to the wall of the hollow shaft, respectively.

The at least one electrical component part is fastened to the printed circuit board and can be connected in an electrically conductive manner or electrically contacted, respectively, to the printed circuit board. The rectifier can advantageously have several electrical component parts, which are fastened to the printed circuit board. The respective electrical component parts can thereby be electrically conductively connected to one another or electrically contacted with one another, respectively, via the printed circuit board. The electrical component parts can be, for example, diodes and/or electrical resistors and/or further elements. It goes without saying that the respective electrical component parts are connected on the printed circuit board to form a rectifier circuit. The rectifier or the rectifier circuit, respectively, is expediently electrically conductively contacted with a rotor winding of the rotor lying outside of the hollow shaft, for example through the hollow shaft.

In the rotor assembly according to the invention, the rectifier is arranged in the cavity of the hollow shaft and the respective electrical component parts can be arranged centrally or on a smaller diameter, respectively, on the printed circuit board. The centrifugal forces, which act on the respective electrical component parts in the case of identical rotational speed of the rotor assembly, can thus be reduced. The rotor assembly can thus be operated at a higher rotational speed, without the respective electrical component parts or the soldered joints thereof and thus the rectifier being damaged. The rotor assembly can thus have a higher rotational speed stability.

Within the hollow shaft, the rectifier can additionally be protected against a mechanical damage against environmental impacts, such as, for example, against a cooling medium, a contamination with electrically conductive particles, etc. The hollow shaft additionally represents a shielding against the coupling-in of inferences, such as, for example, EMC interferences (EMC: electromagnetic compatibility), so that an additional housing is not necessary for the rectifier. The rectifier can furthermore be balanced with the rotor assembly or with the rotor, respectively, in a common balancing process. The balance quality can be maximized or the permissible residual imbalance can be minimized, respectively, by means of the common balancing process.

It can advantageously be provided that the at least one electrical component part of the rectifier is mechanically supported on the hollow shaft. The at least one electrical component part can thus be protected particularly effectively against the mechanical damage.

The hollow shaft can be formed of a shaft end and a shaft cover axially closing the shaft end. The shaft end and the shaft cover can be firmly connected by means of a substance-to-substance bond and/or in a non-positive manner and/or in a positive manner during the assembly of the hollow shaft and can limit the cavity of the hollow shaft to the outside. The rectifier can be firmly connected to the shaft end or to the shaft cover of the hollow shaft. The rectifier can in particular be firmly connected by means of a substance-to-substance bond and/or in a non-positive manner and/or in a positive manner to the shaft end or to the shaft cover. The assembly of the rectifier can thereby take place during the assembly of the hollow shaft.

In the case of an advantageous embodiment of the rotor assembly, it is provided that the rectifier has a cooling body. The cooling body is thereby fastened to the printed circuit board of the rectifier so as to face away from the at least one electrical component part and so as to transmit heat. The cooling body is thus connected to the printed circuit board so as to transmit heat and can dissipate the heat generated by means of the at least one electrical component part to the outside, for example to a medium surrounding the cooling body. The printed circuit board and the at least one electrical component part can thus be cooled effectively. Expediently, the cooling body can be formed from of a heat-conducting material.

The at least one electrical component part of the rectifier can additionally be encapsulated with a heat-conducting casting compound. The heat conduction in the rectifier and thus the cooling of the at least one electrical component part can be improved by means of the casting compound. A damage to the at least one electrical component part due to vibrations/shock can additionally be avoided by means of the casting compound. Alternatively or additionally, it can be provided that the at least one electrical component part in the rectifier is connected to the printed circuit board and/or the at least one printed circuit board is connected to the cooling body, in each case via a heat-conducting heat conduction pad so as to transmit heat. The heat conduction in the rectifier and thus the cooling of the at least one electrical component part and/or of the printed circuit board can thus be improved.

To improve the cooling of the rectifier, the cooling body can have a cooling structure facing away from the printed circuit board. The cooling structure can be realized, for example, by means of at least one cooling rib and/or by means of several cooling pins. The surface of the cooling body adjacent to a surrounding medium can be enlarged by means of the cooling structure and the heat dissipation to the medium can thus be intensified. As a whole, the cooling of the rectifier can thus be improved.

The cooling body can advantageously be electrically insulated from the hollow shaft by means of a dielectric sheathing. Alternatively or additionally, the cooling body can be formed from a dielectric material, preferably from a composite material. A damage to the rectifier or to the at least one electrical component part, respectively, by the ring currents generated in the rotor can thus be prevented.

In the case of an advantageous embodiment of the rotor assembly, the cooling body can divide the cavity of the hollow shaft in a fluid-tight manner into a cooling chamber and into a transmission chamber. The cooling chamber can thereby be arranged so as to face away from the printed circuit board and so that a liquid or gaseous cooling fluid can flow through it. The transmission chamber can receive the printed circuit board. In other words, the rectifier is arranged so as to face the transmission chamber with the printed circuit board and so as to face the cooling chamber with the cooling body. To seal the cooling chamber against the transmission chamber, the cooling body can have at least one sealing element. The sealing element can be, for example, an annular seal. The cooling body can be embodied as separate component part thereby and can be fastened in a positive manner to the shaft end or to the shaft cover.

The cooling fluid flows over and/or flows around the cooling body in the cooling chamber and dissipates the heat from the cooling body. The printed circuit board and the at least one electrical component part can thus be cooled effectively during the operation of the rotor assembly and can remain below an upper temperature limit. The continuous performance and the peak performance of the rotor assembly can thus be increased without the use of high-temperature components. In the case of a higher performance density, costs of the rotor assembly can thus be reduced.

It can additionally be provided that the hollow shaft has an axial end, which is open to the outside and leads into the cooling chamber, and the cooling fluid can flow into the cooling chamber of the hollow shaft via the open axial end. The hollow shaft then also has at least one opening, which leads radially to the outside from the cooling chamber, and the cooling fluid can flow out of the cooling chamber of the hollow shaft via the at least one opening. The ambient temperatures of the rectifier compared to conventional solutions are reduced by means of a direct cooling of the hollow shaft and of the rotor with the cooling fluid.

The secondary coil of the secondary-side circuit can advantageously be arranged in the cavity of the hollow shaft or outside of the cavity of the hollow shaft so as to be capable of interacting inductively with a primary-side circuit of the energy transmitter. If the secondary coil is arranged in the cavity of the hollow shaft, the secondary coil can thus be fastened to a wall of the hollow shaft within the cavity so as to revolve around the axis of rotation. If the cavity is divided into the cooling chamber and into the transmission chamber, the secondary coil can thus be arranged in the transmission chamber. It goes without saying that the secondary coil and the at least one electrical component part of the rectifier are electrically conductively connected to one another or electrically contacted with one another, respectively.

The invention also relates to an inductively electrically excited synchronous machine comprising the above-described rotor assembly. The synchronous machine additionally has a stator assembly comprising a stator, wherein the rotor assembly is received in the stator so as to be capable of being rotated about the axis of rotation. The rotor of the rotor assembly and the stator of the stator assembly are thereby arranged at a radial distance from one another so as to be capable of interacting with one another electromagnetically. The stator assembly has a primary-side circuit of the inductive energy transmitter comprising an inverter and a primary coil. The primary-side circuit is thereby arranged in a rotationally fixed manner in the stator assembly. As already described above, the rotor assembly has the secondary-side circuit of the energy transmitter comprising the secondary coil and the rectifier. The primary coil and the secondary coil are thereby arranged so as to be capable of interacting with one another inductively. The synchronous machine can advantageously be provided for a motor vehicle. To avoid repetitions, reference is made here to the above remarks.

Further important features and advantages of the invention follow from the subclaims, from the drawings and from the corresponding figure description on the basis of the drawings.

It goes without saying that the above-mentioned features and the features, which will be described below, cannot only be used in the respective specified combination but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
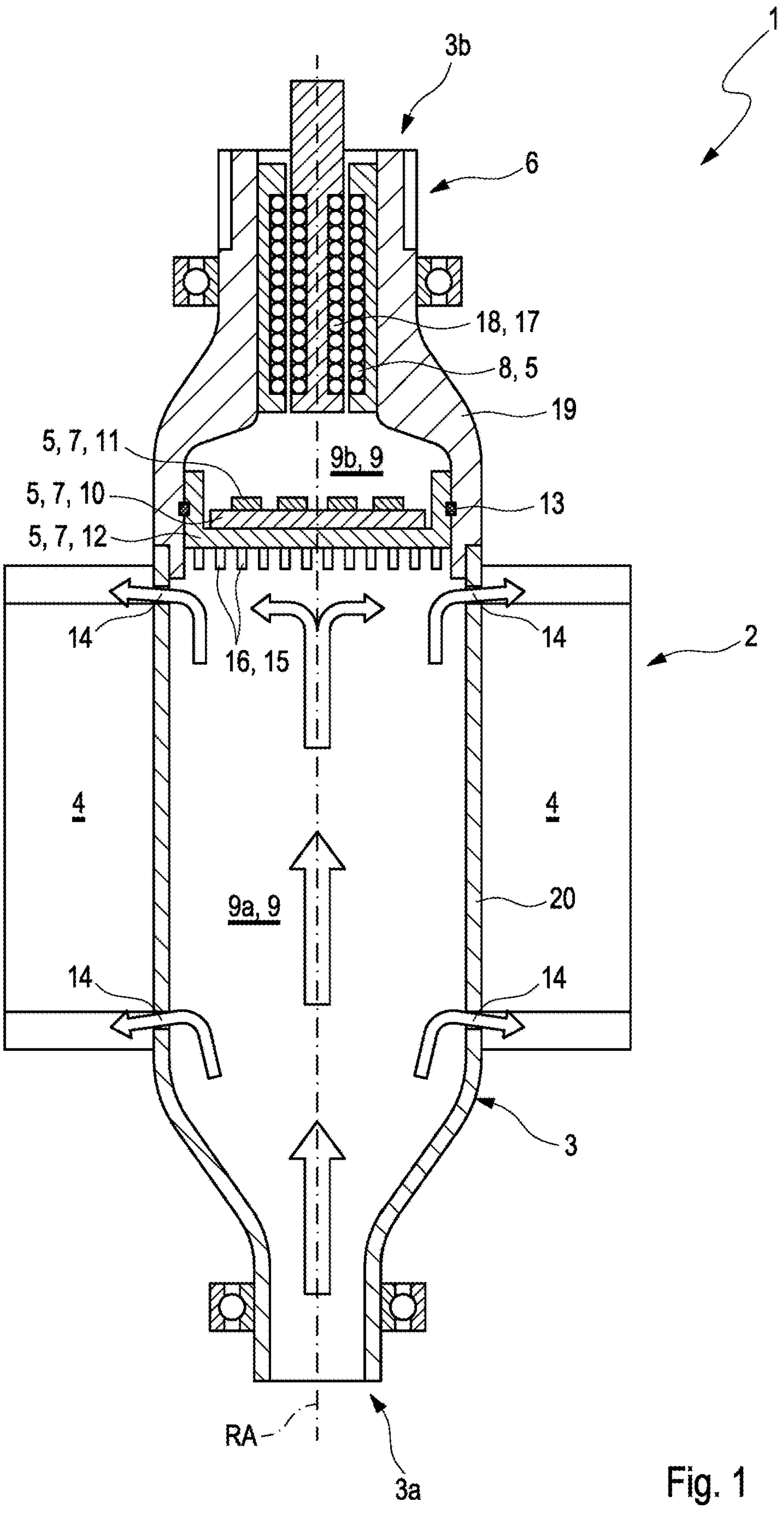
FIG. 1 shows a sectional view of a synchronous machine according to the invention comprising a rotor assembly according to the invention in a first embodiment.

FIG. 1 shows a sectional view of an inductively electrically excited synchronous machine 1 according to the invention comprising a rotor assembly 2 according to the invention in a first embodiment. The rotor assembly 2 thereby has a hollow shaft 3 and a rotor 4, wherein the hollow shaft 3 can be rotated about an axis of rotation RA and the rotor 4 is connected in a rotationally fixed manner to the hollow shaft 3. The rotor assembly 2 additionally has a secondary-side circuit 5 of an energy transmitter 6. The secondary-side circuit 5 is connected in a rotationally fixed manner to the rotor assembly 2 or to the hollow shaft 3, respectively, and comprises, see also FIG. 3 with regard to this, a rectifier 7 and a secondary coil 8. The hollow shaft 3 additionally has a cavity 9 and the secondary-side circuit 5, thus the rectifier 7 and a secondary coil 8 here, are arranged in the cavity 9.

The rectifier 7 thereby has a printed circuit board 10 comprising several electrical component parts 11 and a cooling body 12. The cooling body 12 thereby abuts against the printed circuit board 10 facing away from the electrical component parts 11 and is connected to the printed circuit board 10 so as to transmit heat. Alternatively, the cooling body 12 can abut directly against the electrical component parts 11 so as to transmit heat. The heat from the electrical component parts 11 can thus be dissipated directly to the cooling body 12 and the heat conducting path can thus be shortened. The heat generated in the electrical component parts 11 can thus be dissipated to the cooling body 12 via the printed circuit board 10. The rectifier 7 is aligned transversely to the axis of rotation RA in the cavity 9 and divides the cavity 9 into a cooling chamber 9*a* and a transmission chamber 9*b*. The cooling body 12 of the rectifier 7 thereby seals the cooling chamber 9*a* and the transmission chamber 9*b* from one another in a fluid-tight manner. For this purpose, an annular sealing element 13, which revolves around the axis of rotation RA, is arranged between the cooling body 12 and the hollow shaft 3. The rectifier 7 is thereby arranged so as to face the cooling chamber 9*a* with the cooling body 12 and so as to face the transmission chamber 9*b* with the printed circuit board 10. The secondary coil 8 is secured to an inner wall of the hollow shaft 3 in the transmission chamber 9*b*.

A gaseous or liquid cooling fluid can flow through the cooling chamber 9*a*. The fooling fluid thereby flows into the cooling chamber 9*a* on an axial end 3*a* of the hollow shaft 3, which is open to the outside, and out of the cooling chamber 9*a* via several openings 14 leading radially to the outside. The axial end 3*a* is thereby arranged so as to be located axially opposite an A-side axial end 3*b* of the hollow shaft 3. The cooling fluid thereby flows around the cooling body 12, and the heat is dissipated to the cooling fluid by the cooling body 12. Facing the cooling chamber 9*a*, the cooling body 12 additionally has a cooling structure 15 comprising several cooling ribs 16, or alternatively comprising several cooling pins, which additionally intensify the heat dissipation to the cooling fluid.

Figure 3:
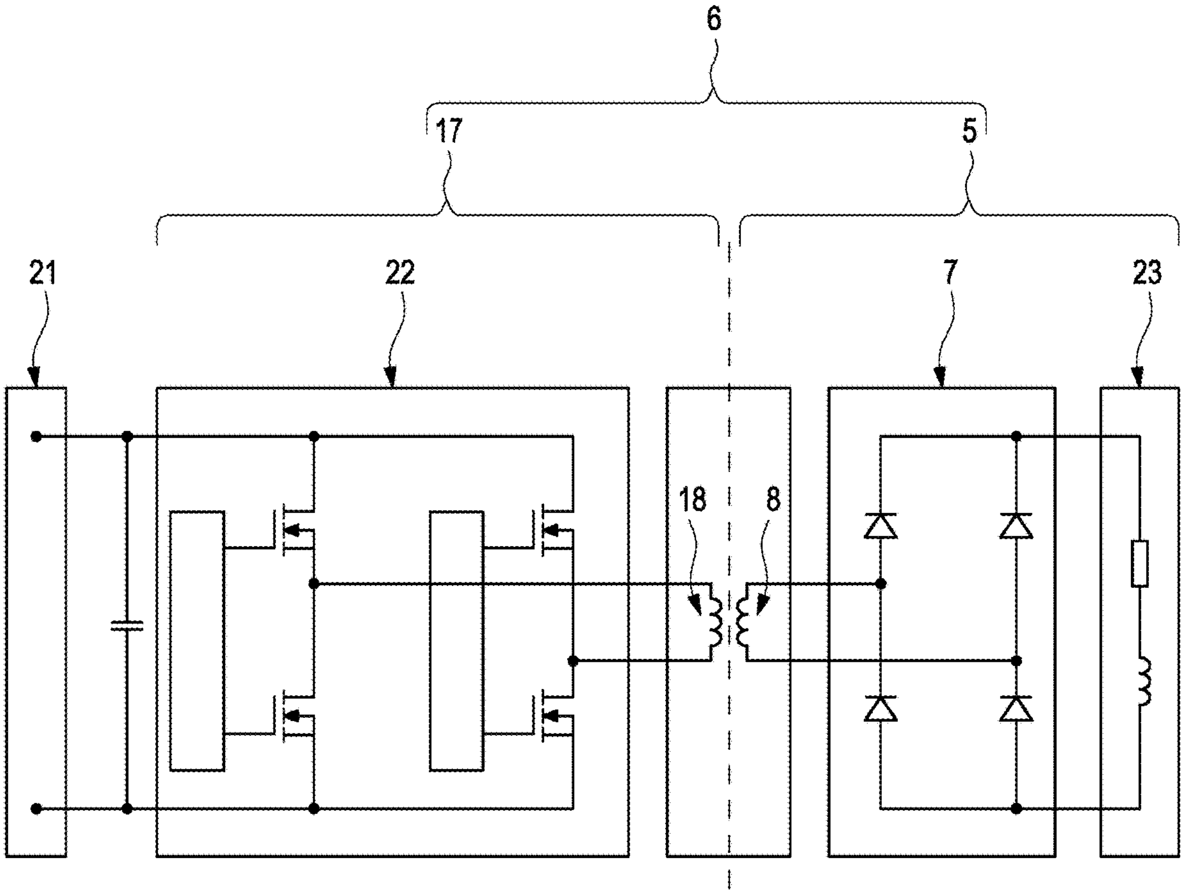
FIG. 3 shows a circuit diagram of an energy transmitter in the synchronous machine according to the invention.

The synchronous machine 1 additionally has a primary-side circuit 17 of the energy transmitter 6 comprising a primary coil 18, see also FIG. 3 with regard to this. The primary coil 18 thereby protrudes into the transmission chamber 9*b* and into the annular secondary coil 8. An annular gap, which revolves around the axis of rotation RA, is formed between the secondary coil 8 and the primary coil 18, and the secondary coil 8 and the primary coil 18 can interact with one another electromagnetically or so as to transmit energy, respectively, or inductively, respectively, via the gap.

For the simplified assembly, the hollow shaft 3 is formed in two pieces and has a shaft end 19 and a shaft cover 20. The shaft end 19 thereby encompasses the transmission chamber 9*b* of the hollow shaft 3 and is assigned to the A-side axial end 3*b* of the hollow shaft 3. The shaft end 19 and the shaft cover 20 are both formed in a bottle-shaped manner, so that the cavity 9 widens from the axial end 3*a* to the center and narrows from the center to the A-side axial end 3*b*. In the first embodiment, the rectifier 7 is arranged in the shaft end 19 and the secondary coil 9 in a narrower region of the cavity 9 or of the transmission chamber 9*b*, respectively.

It goes without saying that the synchronous machine 1 also comprises a stator and a housing, which are arranged so as to revolve around the rotor assembly 2 about the axis of rotation RA. The stator and the housing, however, are not shown here for the sake of clarity.

Figure 2:
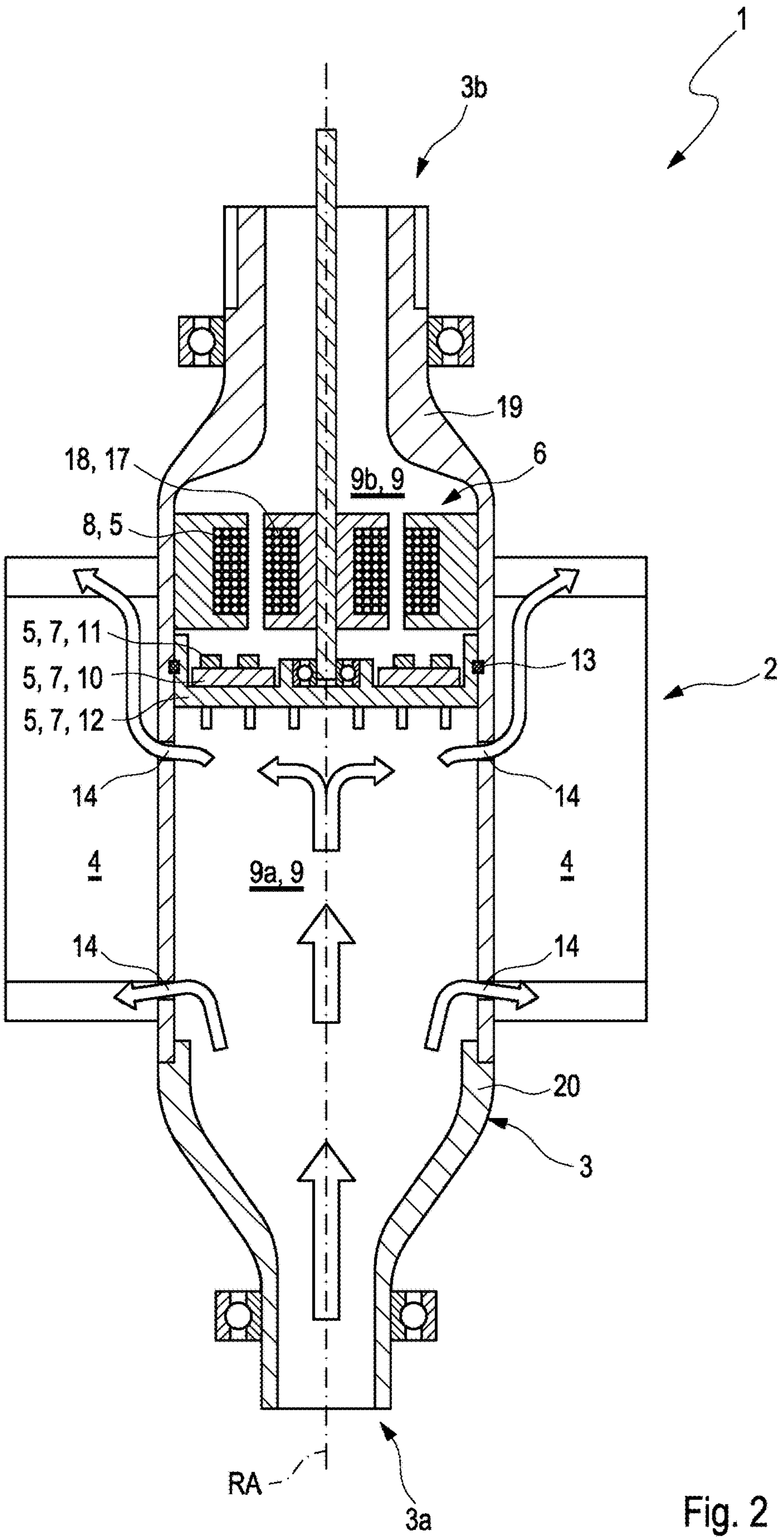
FIG. 2 shows a sectional view of the synchronous machine according to the invention comprising the rotor assembly according to the invention in a second embodiment.

FIG. 2 shows a sectional view of the synchronous machine 1 according to the invention comprising the rotor assembly 2 according to the invention in a second embodiment. Deviating from the first embodiment in FIG. 1, the shaft end 19 has a larger axial length here compared to the first embodiment in FIG. 1. The secondary coil 8 is thereby arranged in a wider region of the cavity 9 or of the transmission chamber 9*b*, respectively, and is formed to be axially more compact.

FIG. 3 shows a circuit diagram of the energy transmitter 6 in the synchronous machine 1 according to the invention. The energy transmitter 6 thereby has the primary-side circuit 17 comprising a connection 21, an inverter 22 and the primary coil 18. The connection 21 can be provided, for example, for interconnecting the energy transmitter 6 to a board electronics of a motor vehicle. The energy transmitter 6 additionally has the secondary-side circuit 5 comprising the secondary coil 8, the rectifier 7 and a rotor winding 23 of the rotor.

The invention claimed is:

1. A rotor assembly for an inductively electrically excited synchronous machine, comprising:

a hollow shaft rotatable about an axis of rotation;

a rotor connected in a rotationally fixed manner to the hollow shaft;

a secondary-side circuit of an energy transmitter, the secondary-side circuit arranged in a rotationally fixed manner in the rotor assembly;

the secondary-side circuit including a rectifier and a secondary coil, the rectifier including a printed circuit board and at least one electrical component part fastened to the printed circuit board;

wherein the rectifier is aligned transversely to the axis of rotation and is arranged in a rotationally fixed manner in a cavity of the hollow shaft;

wherein the secondary coil of the secondary-side circuit is arranged in the cavity of the hollow shaft and defines a space configured to receive at least a portion of a primary coil of a primary-side circuit of the energy transmitter; and wherein the rectifier further includes a cooling body of a heat-conducting material, the cooling body abutting against the printed circuit board of the rectifier such that the cooling body faces away from the at least one electrical component part and transmits heat.

2. The rotor assembly according to claim 1, wherein the at least one electrical component part of the rectifier is mechanically supported on the hollow shaft.

3. The rotor assembly according to claim 1, wherein:

the hollow shaft is formed of a shaft end and a shaft cover axially closing the shaft end; and the rectifier is firmly connected to at least one of the shaft end and the shaft cover of the hollow shaft.

4. The rotor assembly according to claim 1, wherein the at least one electrical component part of the rectifier is encapsulated with a heat-conducting casting compound.

5. The rotor assembly according to claim 1, wherein the cooling body is electrically insulated from the hollow shaft via a dielectric sheathing.

6. The rotor assembly according to claim 1, wherein the cooling body includes a cooling structure facing away from the printed circuit board.

7. The rotor assembly according to claim 1, wherein the cooling body divides the cavity of the hollow shaft in a fluid-tight manner into (i) a cooling chamber facing away from the printed circuit board and through which at least one of a liquid and a gaseous cooling fluid is flowable and (ii) a transmission chamber receiving the printed circuit board.

8. The rotor assembly according to claim 7, wherein:

the hollow shaft has an open axial end, which is open to an outside and extends into the cooling chamber;

the cooling fluid is flowable into the cooling chamber of the hollow shaft via the open axial end;

the hollow shaft further has at least one opening, which extends radially to the outside from the cooling chamber; and the cooling fluid is flowable out of the cooling chamber of the hollow shaft via the at least one opening.

9. An inductively electrically excited synchronous machine, comprising:

the rotor assembly according to claim 1;

a stator assembly including a stator;

the rotor assembly received in the stator such that the rotor assembly is rotatable about the axis of rotation;

the stator assembly including a primary-side circuit of the energy transmitter;

the primary-side circuit arranged in a rotationally fixed manner in the stator assembly;

wherein the primary-side circuit includes an inverter and a primary coil; and wherein the primary coil and the secondary coil are arranged such that the primary coil and the secondary coil are interactable with one another inductively.

10. The rotor assembly according to claim 1, wherein:

the at least one electrical component part of the rectifier is connected to the printed circuit board via a heat-conducting heat conduction pad so as to transmit heat; and/or the at least one printed circuit board of the rectifier is connected to the cooling body via a heat-conducting heat conduction pad so as to transmit heat.

11. The rotor assembly according to claim 1, wherein the secondary coil is fastened to an inner surface of the hollow shaft and the space is disposed radially inward of the secondary coil.

12. The rotor assembly according to claim 1, wherein the cooling body includes:

a base wall oriented transversely to the axis of rotation; and an outer wall projecting from the base wall and extending around an outer perimeter of the base wall.

13. The rotor assembly according to claim 12, further comprising an annular sealing element arranged radially between the outer wall of the cooling body and the hollow shaft.

14. The rotor assembly according to claim 1, wherein:

the cavity of the hollow shaft is divided in a fluid-tight manner into (i) a cooling chamber through which a liquid and/or a gaseous cooling fluid is flowable and (ii) a transmission chamber in which the printed circuit board is arranged; and the hollow shaft includes:

an open axial end via which the cooling fluid is flowable into the cooling chamber of the hollow shaft; and at least one radially extending opening via which the cooling fluid is flowable out of the cooling chamber of the hollow shaft.

15. A rotor assembly for an inductively electrically excited synchronous machine, comprising:

a hollow shaft rotatable about an axis of rotation, the hollow shaft including a cavity;

a rotor connected in a rotationally fixed manner to the hollow shaft;

a secondary-side circuit of an energy transmitter, the secondary-side circuit connected in a rotationally fixed manner to the hollow shaft, the secondary-side circuit including a rectifier and a secondary coil;

wherein the rectifier is aligned transversely to the axis of rotation and divides the cavity of the hollow shaft into (i) a cooling chamber and (ii) a transmission chamber; and wherein the rectifier includes a printed circuit board, at least one electrical component part fastened to a first side of the printed circuit board, and a cooling body abutting an opposite, second side of the printed circuit board.

16. The rotor assembly according to claim 15, further comprising an annular seal extending circumferentially around the axis of rotation, wherein the annular seal is disposed radially between the cooling body and the hollow shaft and, in conjunction with the cooling body, seals the cooling chamber and the transmission chamber from one another in a fluid-tight manner.

17. The rotor assembly according to claim 16, wherein the hollow shaft further includes:

a first, open axial end via which cooling fluid is flowable into the cooling chamber;

an opposite, second axial end at which the secondary coil is arranged; and a plurality of radial openings via which the cooling fluid is flowable out of the cooling chamber, the plurality of radial openings disposed axially between the rectifier and the first axial end of the hollow shaft.

18. The rotor assembly according to claim 15, wherein:

the rectifier is oriented within the cavity such that the printed circuit board is disposed in the transmission chamber; and the secondary coil is arranged in the transmission chamber and is secured to an inner wall of the hollow shaft.

19. A rotor assembly for an inductively electrically excited synchronous machine, comprising:

a hollow shaft rotatable about an axis of rotation, the hollow shaft including a cavity;

a rotor connected in a rotationally fixed manner to the hollow shaft;

a secondary-side circuit of an energy transmitter, the secondary-side circuit connected in a rotationally fixed manner to the hollow shaft, the secondary-side circuit including a rectifier and a secondary coil;

wherein the rectifier is aligned transversely to the axis of rotation;

wherein the rectifier includes a printed circuit board, at least one electrical component part fastened to a first side of the printed circuit board, and a cooling body abutting an opposite, second side of the printed circuit board; and wherein the cooling body includes an engagement formation configured to receive at least a portion of a shaft of a primary-side circuit of the energy transmitter.

20. The rotor assembly according to claim 19, wherein:

the cooling body includes a base wall oriented transversely to the axis of rotation; and the engagement formation is an annular collar projecting from the base wall of the cooling body.

* * * * *